Figure 1:
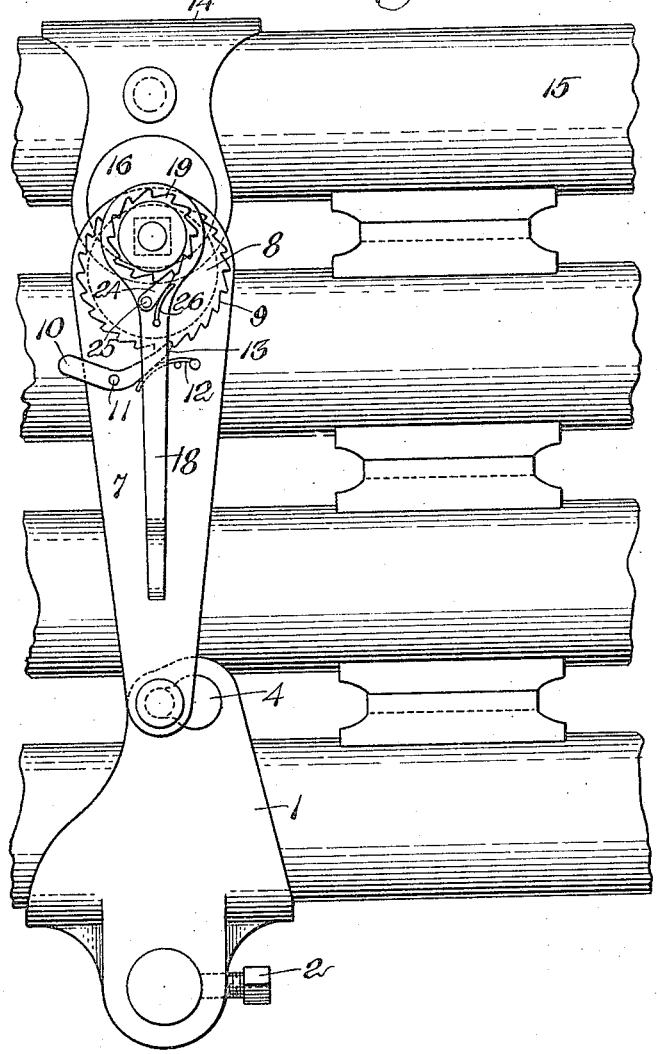

J. P. McGINNIS.
VEHICLE TOP BOW CLAMP.
APPLICATION FILED SEPT. 8, 1914.

1,144,659.

Patented June 29, 1915.

Witnesses:
James R. Hodder
R. J. Hersey

Inventor:
Joseph P. McGinnis,
by Geo. N. Maxwell, atty.

UNITED STATES PATENT OFFICE.

JOSEPH P. McGINNIS, OF BOSTON, MASSACHUSETTS, ASSIGNOR OF ONE-HALF TO CHARLES W. WHELPLEY, OF BOSTON, MASSACHUSETTS.

VEHICLE TOP-BOW CLAMP.

1,144,659.  Specification of Letters Patent.  Patented June 29, 1915.

Substitute for application Serial No. 686,704, filed March 27, 1912. This application filed September 8, 1914. Serial No. 860,529.

*To all whom it may concern:*

Be it known that I, JOSEPH P. McGINNIS, a citizen of the United States, and resident of Boston, county of Suffolk, State of Massachusetts, have invented an Improvement in Vehicle Top-Bow Clamps, of which the following description, in connection with the accompanying drawings, is a specification, like letters on the drawings representing like parts.

This invention relates to adjustable clamps intended to hold the bows of a vehicle top when the top is in its folded position.

Folding vehicle tops such as are now generally used on automobiles and like vehicles comprise a plurality of bows which are arranged to spread the top, which bows are folded at the sides and rear of the vehicle when the top is lowered and not in use. When the top is so folded, it is necessary to apply to the bows upon each side of the vehicle, clamps which will effectually secure the bows in their lowered or folded position and which will also hold them rigidly to the vehicle itself. While in this folded position a "slip-cover" may be readily applied to the top, which envelops both top and bows to preserve the same, to keep out dust, and to give a neat appearance to the vehicle.

The object of my invention is to provide an improved bow clamp which will be easily attachable and detachable, both to the vehicle and to the bows, which will be capable of quick adjustment to clamp the bows tightly and stay locked automatically in the position to which it is adjusted, and which may be quickly released and detached.

An important feature of my invention is that it may be utilized as an additional holder for the slip-cover, and that it may, when detached from the bows, be removed with the slip-cover, its light and simple construction and compact form rendering the same possible.

Preferably my invention comprises a lower clamp which supports and engages the lowest bow of the top and has an upwardly extending member, and a clamp which engages the upper bow of the top, which has a downwardly extending portion carrying an eccentric bearing arranged adjacent to the upper end of said member, which member also carries an eccentric bearing, in combination with means to actuate both eccentrics in their respective bearings and shorten the clamp.

By this construction, a simple and efficient device is provided, capable of very quick and powerful action in its tightening effect on the bows. Preferably also an automatic locking device is provided so that the eccentrics will stay in their adjusted position, and on the release of such locking device the normal resiliency of the bows and the top carried by them will restore the eccentrics to unclamped position.

Figure 2:
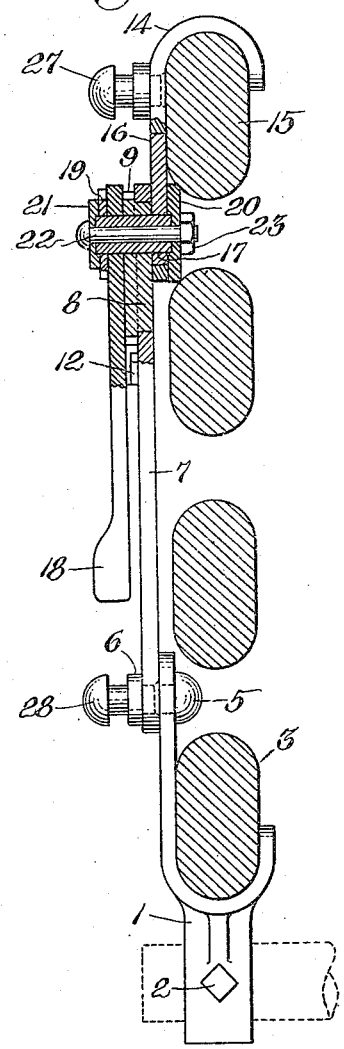
Figure 3:
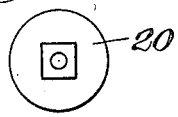

Referring to the drawings, wherein a preferred embodiment of the invention is illustrated, Figure 1 is a general view of the clamp applied to a plurality of bows, which bows are in their folded position, only small portions thereof being shown; Fig. 2 is a view, partially in cross section, of the clamp and bows as seen in Fig. 1; and Fig. 3 is a detail of the clamping washers used.

A short stud is usually affixed to each side of a vehicle on which a bow clamp may be secured. Such a stud is illustrated in dotted lines in Fig. 2. A rest or support 1 is adapted to fit on the side stud of a vehicle, and may be secured thereto in any desired position by a set screw 2. This support is arranged in U form, of proper size to hold the lowermost bow 3 of the top when said top is folded, and one of the U arms is extended and provided with a button-hole aperture 4.

A bolt 5 having a collar 6 is secured to a member 7, which bolt is of suitable diameter to pass through the larger portion of the button-hole opening 4 and to have its shank fit the shoulder of the smaller diameter in said opening, as illustrated in Fig. 1.

The upper portion of the member 7 carries an eccentric bearing 8 having ratchet teeth as indicated at 9 of slightly larger diameter than the bearing and overlapping the member 7 slightly, as shown in Fig. 2. A detent 10 is pivoted at 11 to the member 2, and a spring 12 is provided on said member 7 to engage the detent 10 and normally hold its inner end 13 in engagement with the teeth of the eccentric 8. An upper clamping member 14 which engages the top bow 15 carries in its lower portion an eccentric bearing 16, these two members 7 and 14 being of appropriate length to provide a slightly greater span than the normal distance between the lower bow 3 and the topmost bow 15 when the top is lowered and said bows are in their folded position. The eccentric bearings 8 and 16 are adapted to receive a spindle 17 which is square in cross section, and which spindle serves to hold the clamping members 14 and 7 together. The spindle 17 is extended beyond the eccentric bearing 8 sufficiently to support a lever 18 and to carry a ratchet wheel 19 arranged on the outside of the lever 18 and rigid with the spindle.

Suitable washers 20 and 21 are provided, as shown, and the spindle 17 is bored to receive a headed bolt 22 which passes through the washers 20 and 21, receiving a nut 23, which bolt retains the washers in their respective positions and consequently holds the clamping members and the lever 18 properly assembled. These washers 20 and 21 have suitable squared recesses, as illustrated in Fig. 3, to fit the ends of the spindle 17 to allow the washers and the bolt 22 to turn with the spindle 17 during manipulation thereof without danger of loosening the nut 23.

A pawl 24 is pivoted at 25 to the lever 18, and a spring 26 is arranged to hold the end of the pawl in engagement with the teeth on the gear wheel 19. The lever 18 which is supported on the spindle 17 has an aperture sufficiently large so that it will be capable of relative movement on said spindle, whereas the spindle is of such size as to fit closely the squared apertures in the two eccentrics 8 and 16.

It will be readily understood that the entire clamp can be quickly shortened by a few movements of the lever 18 to and fro, said lever, through the pawl 24, engaging the ratchet wheel 19 and tending to move the eccentrics to the right as shown in Fig. 1, such movement being retained by the action of the detent 10 on the teeth 9 of the eccentric 8. The movement of both eccentrics provides a very quick and powerful adjusting device which exerts the desired tension upon the lower and topmost bows, holding them firmly and being automatically locked in the position to which the clamp is adjusted. By releasing the detent 10 from its engagement with the teeth of the eccentric 8, the clamp may be readily expanded, as the eccentrics are easily returned to their position affording the greatest span to the clamp. This action is also assisted by the natural expansive tendency of the bows and the folded top.

It is frequently desirable to detach the entire clamping member from the vehicle, which can easily be done by loosening the set screw 2 and removing the device from the supporting stud. However, it is ordinarily desirable to remove only the upper part of the clamp, as the lower support or rest 1 is not in the way when the top is up. Therefore I have provided a quick detachable means through the engagement with said lower member 1 of the bolt 5 which is fixed to the member 7. When the clamping tension has been released, the member 7 may be swung to the right relatively with the member 1 and the bolt 5 slipped out of the larger portion of the opening 4. If a slip-cover is put over the top, it may be provided with means to engage the buttons 27 and 28, and the entire clamping device except the lower rest 1 may be left attached to the slip-cover, removed from engagement with the member 1, and removed and folded up with said cover.

It will thus be seen that I have provided a very powerful and compact clamp of especial value when applied to holding the bows of vehicle tops in their folded position, such clamp being of very simple construction, economical to manufacture, powerful in operation, and easily attachable and detachable. It may also be of such light weight as to be left in engagement with the slip-cover and removed with it, which is a very appreciable advantage in this style of clamps.

Having described my invention, what I claim as new and desire to secure by Letters Patent is:

1. A bow clamp for vehicle-tops, comprising a rest for the lower bow, a member detachably secured thereto and having an eccentric bearing in its upper portion, a second member adapted to engage the top bow and having an eccentric bearing in its lower portion, a spindle passing through the bearings of each eccentric, and means to actuate both said eccentrics to shorten the clamp.

2. A bow clamp for vehicle-tops, comprising a rest for the lower bow, a member detachably secured thereto and having an eccentric bearing in its upper portion, a second member adapted to engage the top bow and having an eccentric bearing in its lower portion, a spindle passing through each eccentric, having means to retain said members in their assembled position, and means to actuate said spindle to impart a rotative movement to both eccentrics whereby the clamp is shortened.

3. A bow clamp for vehicle-tops, comprising a rest for the lower bow, a member detachably secured thereto and having an eccentric bearing in its upper portion with ratchet teeth thereon, a second member to engage the top bow and having an eccentric bearing in its lower portion, a squared spindle passing through both eccentrics, a lever to actuate the spindle, a detent to engage the teeth of the eccentric in said first mentioned member and being pivotally secured to said member, whereby said detent will hold automatically, both the eccentrics in the position to which they are moved by the actuation of the lever.

4. A bow clamp for vehicle tops, comprising a rest for the lower bow, a member detachably secured thereto and having an eccentric bearing in its upper portion, a second member adapted to engage the top bow and have an eccentric bearing in its lower portion, a spindle passing through the eccentrics, means carried by said spindle to actuate the eccentrics to shorten the clamp, and a washer upon each end of said spindle having a recess therein to fit the end of the spindle, said washers being constructed and arranged to hold the eccentrics in their assembled position on the spindle.

In testimony whereof, I have signed my name to this specification, in the presence of two subscribing witnesses.

JOSEPH P. McGINNIS.

Witnesses:
CHARLES W. WHELPLEY,
JAMES R. HODDER.

Copies of this patent may be obtained for five cents each, by addressing the "Commissioner of Patents, Washington, D. C."